United States Patent
Knight et al.

(10) Patent No.: US 10,903,765 B2
(45) Date of Patent: Jan. 26, 2021

(54) PROGRAMMABLE POWER TOOL WITH BRUSHLESS DC MOTOR

(71) Applicant: TRANSFORM SR BRANDS LLC, Hoffman Estates, IL (US)

(72) Inventors: Colin G. Knight, Winnetka, IL (US); Milos Coric, Lincolnshire, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 2001 days.

(21) Appl. No.: 13/735,865

(22) Filed: Jan. 7, 2013

(65) Prior Publication Data
US 2013/0187587 A1    Jul. 25, 2013

Related U.S. Application Data

(60) Provisional application No. 61/583,846, filed on Jan. 6, 2012.

(51) Int. Cl.
*H02K 29/12* (2006.01)
*B25B 21/02* (2006.01)
*H02P 6/16* (2016.01)

(52) U.S. Cl.
CPC ...................... *H02P 6/16* (2013.01)

(58) Field of Classification Search
CPC .................... H02P 6/08; H02P 6/16
USPC ................. 318/400.37, 476; 173/1
See application file for complete search history.

(56) References Cited

U.S. PATENT DOCUMENTS

| | | | | |
|---|---|---|---|---|
| 3,813,931 A | * | 6/1974 | Rennick | G01M 15/06 324/392 |
| 4,933,800 A | * | 6/1990 | Yang | G05B 19/4062 361/29 |
| 5,168,202 A | * | 12/1992 | Bradshaw | H02K 29/08 318/608 |

(Continued)

FOREIGN PATENT DOCUMENTS

CA    2528269    12/2004

OTHER PUBLICATIONS

Canadian Patent Office, Requisition by Examiner in Application No. 2,800,792, dated May 9, 2014 (3 pages).

(Continued)

*Primary Examiner* — Eduardo Colon Santana
*Assistant Examiner* — Devon A Joseph
(74) *Attorney, Agent, or Firm* — McAndrews, Held & Malloy, Ltd.

(57) ABSTRACT

A power tool that includes a brushless DC motor, one or more motor sensors, and a controller, such as, for example, an electronic speed control (ESC) circuit. The controller is adapted to provide instructions to control the operation of one or more parameters of the brushless DC motor. The controller is also adapted to receive feedback from one or more motor sensors that reflect whether the motor is attaining the one or more parameters. The controller may also be adapted to have a learning mode, in which feedback provided during use of the power tool is stored by the controller as a program so that the same operating parameters may be subsequently replicated by using the program to operate the tool. The controller may also use the feedback to adjust the operation of the motor so that the motor maintains one or more selected or programmed operating parameters.

18 Claims, 5 Drawing Sheets

(56) References Cited

U.S. PATENT DOCUMENTS

| | | | | |
|---|---|---|---|---|
| 5,505,697 A * | 4/1996 | McKinnon, Jr. | A61M 5/30 | 604/152 |
| 5,681,993 A * | 10/1997 | Heitman | A61B 5/225 | 473/202 |
| 5,747,953 A * | 5/1998 | Philipp | A61B 17/1626 | 318/114 |
| 5,780,936 A * | 7/1998 | Cardello | E06C 5/36 | 187/232 |
| 6,013,991 A * | 1/2000 | Philipp | A61B 17/1626 | 318/114 |
| 7,318,485 B2 * | 1/2008 | Greese | B25B 21/00 | 173/1 |
| 7,375,488 B2 * | 5/2008 | Jones | | 318/725 |
| 7,719,216 B2 * | 5/2010 | Sato | H02P 6/17 | 318/139 |
| 9,281,770 B2 * | 3/2016 | Wood | B25F 5/00 | |
| 2003/0121685 A1 * | 7/2003 | Yamamoto | B25B 23/147 | 173/217 |
| 2005/0099151 A1 * | 5/2005 | Lee | E06B 9/68 | 318/640 |
| 2006/0113096 A1 * | 6/2006 | Yamamoto | B25B 23/147 | 173/1 |
| 2006/0157260 A1 * | 7/2006 | Greese | B25B 21/00 | 173/1 |
| 2006/0197483 A1 * | 9/2006 | Garcia | B23D 59/001 | 318/480 |
| 2006/0260905 A1 * | 11/2006 | Sato | G07D 9/008 | 194/302 |
| 2007/0034394 A1 * | 2/2007 | Gass | B25H 1/0092 | 173/2 |
| 2007/0180959 A1 * | 8/2007 | Tokunaga | B25B 21/00 | 81/474 |
| 2008/0097635 A1 * | 4/2008 | Naumann | B25B 23/14 | 700/95 |
| 2008/0129243 A1 * | 6/2008 | Nashiki | | 318/701 |
| 2008/0173458 A1 * | 7/2008 | Seith et al. | | 173/176 |
| 2008/0196912 A1 * | 8/2008 | Gass et al. | | 173/4 |
| 2008/0202130 A1 * | 8/2008 | Kadyk | A23G 9/045 | 62/68 |
| 2008/0243299 A1 * | 10/2008 | Johnson | G05B 19/414 | 700/169 |
| 2010/0090633 A1 * | 4/2010 | Deller | H02P 6/085 | 318/400.39 |
| 2010/0096155 A1 * | 4/2010 | Iwata | B25B 23/1475 | 173/176 |
| 2010/0289737 A1 * | 11/2010 | Iio | G06F 3/0362 | 345/156 |
| 2011/0073334 A1 * | 3/2011 | Iimura | B25B 21/02 | 173/2 |
| 2011/0114346 A1 * | 5/2011 | Suzuki | B25B 21/02 | 173/2 |
| 2011/0127941 A1 * | 6/2011 | Hirabayashi | B25B 21/008 | 318/476 |
| 2011/0180286 A1 * | 7/2011 | Oomori | H02K 7/145 | 173/20 |
| 2011/0203821 A1 * | 8/2011 | Puzio | B25B 23/14 | 173/1 |
| 2011/0260666 A1 * | 10/2011 | Woodward | | 318/433 |
| 2011/0278035 A1 * | 11/2011 | Chen | B25F 5/001 | 173/170 |
| 2012/0011932 A1 * | 1/2012 | Nakagawa | G06F 3/0383 | 73/379.02 |
| 2012/0068633 A1 * | 3/2012 | Watanabe | B25F 5/001 | 318/3 |
| 2012/0074878 A1 * | 3/2012 | Pant et al. | | 318/139 |
| 2012/0074881 A1 * | 3/2012 | Pant | B25F 5/00 | 318/400.09 |
| 2012/0080944 A1 * | 4/2012 | Recker | H05B 45/10 | 307/25 |
| 2012/0271513 A1 * | 10/2012 | Yoneda | B62D 5/0493 | 701/41 |
| 2012/0319508 A1 * | 12/2012 | Oomori | B25F 5/02 | 310/50 |
| 2013/0025892 A1 * | 1/2013 | Mashiko et al. | | 173/2 |
| 2013/0082631 A1 * | 4/2013 | Suzuki | B25F 5/00 | 318/461 |
| 2013/0160529 A1 * | 6/2013 | Toxler | G01N 33/2852 | 73/61.43 |
| 2013/0169196 A1 * | 7/2013 | Markham | | 318/3 |
| 2013/0186661 A1 * | 7/2013 | Okubo | B25D 11/005 | 173/2 |
| 2013/0292070 A1 * | 11/2013 | Miguel | D21B 1/021 | 162/5 |
| 2013/0310972 A1 * | 11/2013 | Shoffner | B25J 9/1679 | 700/245 |
| 2013/0313925 A1 * | 11/2013 | Mergener | H02K 11/215 | 310/50 |
| 2013/0331994 A1 * | 12/2013 | Ng | B25B 23/147 | 700/275 |

OTHER PUBLICATIONS

Office Action for Canadian Patent Application No. 2,941,582, dated Jul. 4, 2017, 4 pages.

Canadian Patent Office, Requisition by Examiner in Application No. 2,941,582, dated Mar. 12, 2019, 4 pages.

Office Action for Canadian Application No. 2,941,582, dated Jul. 27, 2018, 4 pages.

* cited by examiner

PROGRAMMABLE POWER TOOL WITH BRUSHLESS DC MOTOR

RELATED APPLICATIONS

This application claims priority to U.S. Patent Application No. 61/583,846, having a filing date of Jan. 6, 2012, which is incorporated herein by reference in its entirety.

BACKGROUND OF THE INVENTION

The present application relates generally to power tools, and more particularly, to programmable power tools with a brushless DC motor.

In certain applications, power tools may be powered by brushless DC motor technology, such as, for example, a brushless outrunner motor. Typically, a brushless outrunner motor includes stationary (stator) windings that are excited by conventional DC brushless controllers. During operation, a direct current, which is switched on and off at high frequency for voltage modulation, is typically passed through three or more non-adjacent windings together, and the group so energized is alternated electronically based upon rotor position feedback. The motor also includes permanent magnets that may be mounted on a rotor. During operation of the motor, the flow of electricity through the windings may generate a magnetic flux that results in the spinning of the rotor.

In certain applications, the mere ability of the brushless DC motor to supply power necessary for the basic operation of the power tool, such as, for example, ample torque for a drill to be able to drill a hole in a hard material, may render the operation of the motor/tool sufficient for its use. However, other applications of the tool may require precise control and operation of the motor.

For example, in certain applications, there may be a need to maintain a constant speed (revolutions per minute (RPM)) of the DC motor and the speed of the associated parts or components driven by the motor. However, typically, the speed of the brushless DC motor may decrease as load is applied to the tool. Similarly, an increase in the torque demands on the motor may result in a decrease in the speed of the motor. For example, when using a hand-held portable power tool to polish the paint on the exterior of an automobile, the speed of the tool may decrease when the activated tool, and/or the accessory being driven by the motor, is brought into engagement with the surface of the automobile. Additionally, the speed of the motor may continue to be varied during use by changes in the load on the tool associated with variances in the force at which the user is pressing the tool against the surface of the automobile. Such changes in motor speed, however, may result in variances in the quality of the polishing provided by the operation of the tool.

Similarly, in certain applications, a tool may be required to provide a specific, maximum torque, such as, for example, to prevent over-tightening of a bolt, or to attain a desired tension. However, variability in the control and operation of the brushless DC motors may prohibit and/or limit the use of power tools powered by such motors in these torque specific applications.

The variability in the control and operation of the DC motor of power tools may also preclude precise control of starting and stopping locations of the motor, and moreover, the associated positioning of the component that is being driven by the motor. For example, when tapping a hole using a power tool, the tap drill bit may be intended to complete one forward revolution before being reversed ⅓ of a revolution to break chips of material that did not initially break away from the material. This process of reversing the motor may be repeated until the desired tap depth is reached in the hole. However, given the generally imprecise nature of the operation of brushless DC motor tools, the tap bit typically is not generally stopped at the desired revolution intervals.

BRIEF SUMMARY OF THE INVENTION

Embodiments of the present invention utilize brushless DC motor technology to provide various user features and benefits that enhance the performance characteristics of power tools. In various examples, the power tool is capable of being programmed to monitor, display, and/or control torque or speed of the motor or associated driven component, and/or provide precise stopping, reversing, and/or partial revolutions of the motor, as desired. Additionally, the power tool may provide a strobe lighting effect to provide an illusion that the tool is stationary, with safety features, thereby allowing better vision of the tool path/location.

According to certain embodiments, a power tool for use by a user is provided that includes a brushless DC motor, one or more motor sensors, and a controller having a processor and a memory. The controller is adapted to provide instructions to control the operation of one or more parameters of the brushless DC motor. The controller is also adapted to receive feedback from one or more motor sensors that reflect whether the motor is attaining the one or more parameters. Additionally, the controller is adapted to adjust the instructions provided to control the operation of the brushless DC motor based on the received feedback so that the one or more parameters are attained by the brushless DC motor.

Further, according to another embodiment, a power tool for use by a user is provided that includes a brushless DC motor, one or more motor sensors, and a controller having a processor and a memory. The controller is adapted to provide instructions to control the operation of one or more parameters of the brushless DC motor. The controller is also adapted to receive feedback from one or more motor sensors that reflect whether the motor is attaining the one or more parameters. Further, the controller is adapted to store on the memory the received feedback as at least a part of a program and execute the program to replicate the operating conditions of the brushless DC motor associated with the received feedback.

Additionally, according to another embodiment, a power tool for use by a user is provided that includes a brushless DC motor, one or more motor sensors, and a controller having a processor and a memory. The controller is adapted to receive instructions from the user regarding one or more desired parameters for the operation of the brushless DC motor, as well as monitor the operation of the brushless DC motor. The controller is also adapted to determine, based on the monitored operation of the brushless DC motor, whether the brushless DC motor is maintaining the one or more desired parameters. Additionally, the controller is further adapted to adjust the operation of the brushless DC motor, if necessary, based on the determination of whether the brushless DC motor is not maintaining the one or more desired parameters.

Figure 1:
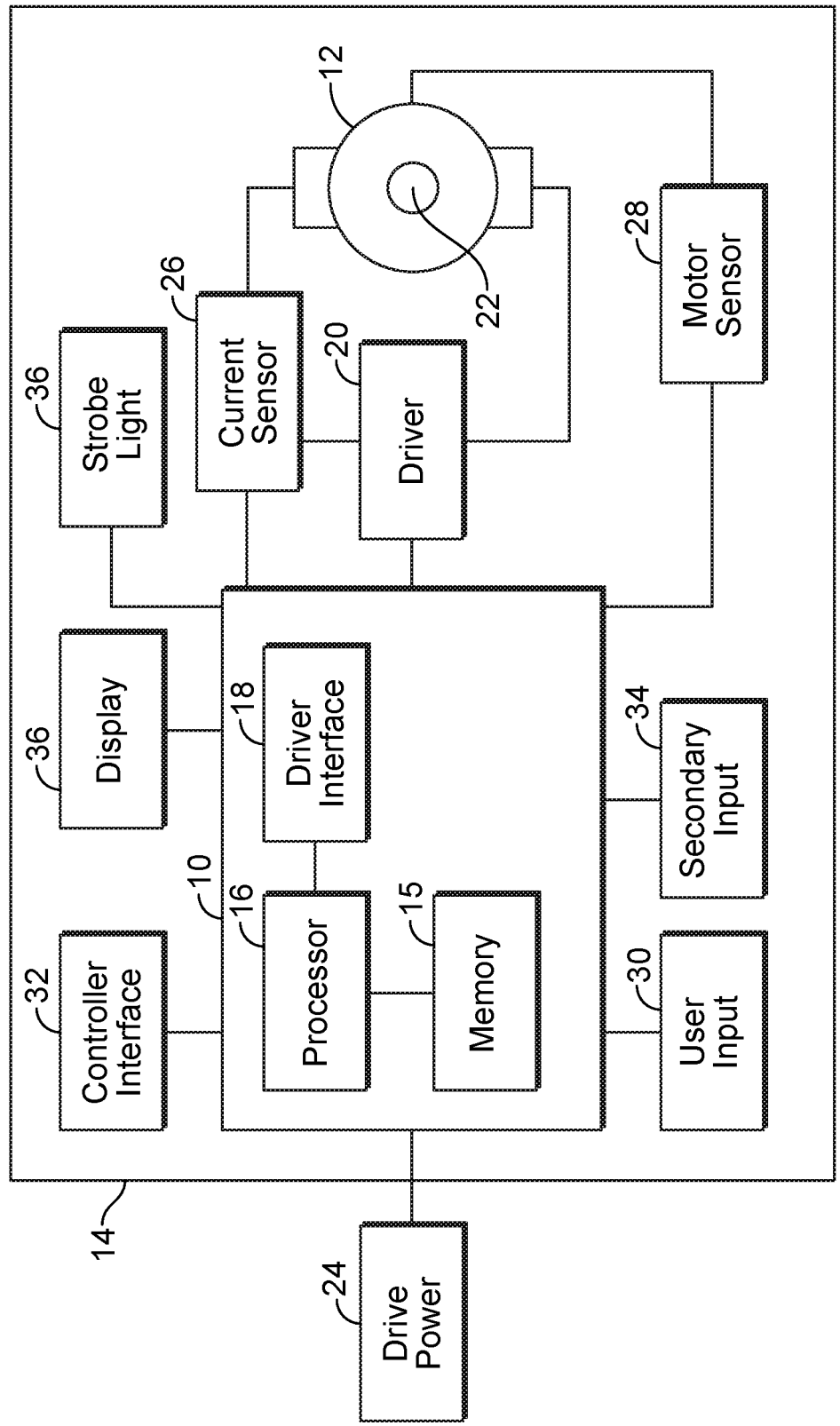
FIG. 1 illustrates a block diagram of a controller and a brushless DC motor for a power tool according to certain embodiments of the present invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DETAILED DESCRIPTION OF THE INVENTION

FIG. 1 illustrates a block diagram of a controller 10 and a brushless DC motor 12 for a power tool 14 according to certain embodiments of the present invention. A wide range of power tools 14 may be powered by the brushless DC motor 12, including, for example, tools that are typically, and generally, in a fixed location, such as, for example, lathes, table saws, drill presses, and milling machines, among others, as well as portable tools, including, for example, drills, routers, and impact drivers, among others. Examples of brushless DC motors 12 include, but are not limited to, out-runner brushless motors. Additionally, the tool 14 may be constructed from a variety of different materials, including, for example, alloy materials. According to certain embodiments, the tool 14 may be manufactured utilizing a Thixomolded process. Additionally, according to certain embodiments, the tool 14 may be provided with a waterproof and/or water-resistant housing to a certain depth. According to such embodiments, the tool 14 may also be provided with a heat exchanger that allows excess heat to be removed from the tool 14 so as to prevent overuse or overheating.

According to certain embodiments, the controller 10 may be, or may include, an Electronic Speed Control (ESC) circuit that may control, vary, and/or stop the rotational displacement, as well change the rotational direction, of the rotor 22, or associated motor shaft, of the motor 12. For example, as shown, the controller 10 includes a memory 15 that is in communication with a processor 16 that is used to control the supply of electricity to the DC motor 12. The processor 16 may be operably connected to a driver interface 18 that supplies control signals from the controller 10 to a driver 20. The driver 20 may be configured communicate electrical current to the motor 12 and/or the windings of the motor 12. Power supplied to the motor 12 may then be used to attain rotational displacement or movement of a rotor 22, which may then drive, either directly and/or indirectly, components of the power tool 14. Additionally, the actual current being supplied to and/or demanded by to the motor 12 may be monitored by the controller 10, such as through the use of a current sensor 26.

Electrical power may be provided to the power tool 14 by a drive power supply 24. A variety of different drive power supplies 24 may be employed, including, for example, power that is being supplied by a utility company, a generator, and/or a battery power supply, such as a lithium-based battery, including a lithium ferrite battery, among others.

Additionally, the power tool 14 may be adapted to be compatible with a variety of different battery configurations, including, for example, stackable batteries and/or batteries that are otherwise expandable to meet the power demands of the power tool 14. For instance, the tool 14 may be a portable power tool that is operably connected to a battery that is an accordion-style removable battery, with the power tool 14 being adapted to receive the insertion and/or removal of multiple cells into/out of the power tool 14, as needed.

The power tool 14 may also include one or more user inputs 30 that are operably connected to the controller 10. According to certain embodiments, the user input 30 may be configured to receive an indication of instructions from the user of the power tool 14. For example, the user input 30 may be a trigger, switch, or lever, among others, that is squeezed, pressed, or otherwise displaced to initiate or reverse rotational displacement of the rotor 22 and/or increase the speed of rotational displacement of the rotor 22. Further, according to certain embodiments, information or data pertaining to the operation of the user input 30 may be recorded or otherwise stored by the memory 15 of the controller 10.

The power tool 14 may also include one or more motor sensors 28 that are operably connected to the controller 10 so as to provide feedback to the controller 10 regarding the operation of the motor 12. For example, the motor sensors 28 may include one or more Hall Effect Sensors, and/or be a shunt resistor, current sensing transformer, and/or optical sensor or encoder, among others, that may be used to provide information to the controller 10 that identifies operating characteristics, parameters, or conditions of the motor 12. For example, according to certain embodiments, three hall sensors may be positioned within the motor 12 that provide information to the controller 10 that may be used to at least detect the speed, rotational direction, and/or position of the rotor 22, as well as for current sensing and proximity switching. Additionally, although sometimes referred to as sensor-less motor control, according to certain embodiments, the one or more motor sensors 28 may also include the back electro-magnetic-force (EMF) method of motor control that may provide information used to measure the speed, rotational direction, and/or position of the rotor 22.

Further, according to certain embodiments, the speed of the motor 12 may be determined with or without the use of the one or more motor sensors 28. For example, the controller 10 may be adapted to calculate the speed of the motor 12 using current sensing calculations where the current may be sensed by the current sensor 26, among other sensors. Further, according to certain embodiments, the torque of the motor 12 may also be calculated, such as by using the sensed current, along with the speed of the motor 12, such by using of the formula Power (Watts)=Torque×2π×RPM/60.

The controller 10 may be pre-programmed with one or more programs containing operational settings for the motor 12. Additionally, the controller 10 may be adapted to, automatically or when desired, have the motor 12 operate at or within specific parameters, such as for example, having a set, limited, or varied torque, speed (RPM), number of revolutions, direction of rotation of the rotor, position for the rotor, and/or any other desirable parameter. Such programmable control of the tool 14 through use of the controller 10 may improve productivity and alleviate user stress in performing tasks requiring high repeatability. Additionally, if used with a mechanical positioning system, the power tool 14 can perform similar to a CNC machine.

Further, the power tool 14 may include a secondary input 34 that is in communication with the controller 10, and which may allow for importing data, programming, or applications to the controller 10. For example, according to certain embodiments, the secondary input 34 may be a data port, such as a USB port, or a wireless, infrared, or Bluetooth connection, among others, that receives, stores, records, or otherwise allows for the transfer of information, including settings, profiles, or actions for the tool 14 to perform, to the controller 10. The programmable content may also include software/firmware updates, usage information, and user feedback, among other information. The programs may also provide the controller 10 with different parameters and/or programs to control the motor 12. Examples of such programs and parameters include, but are not limited to, those parameters and/or programs pertaining to motor braking and operating the motor 12 at a fixed or varied speed.

Using a chosen program, the controller 10 may be capable of controlling the motor 22 using the instructions provided by a specified, chosen program. For example, the chosen program may be a multi-directional program, such as for use in tapping a hole, which includes instructions for one or more partial revolutions of the rotor 22 and/or the associated drill bit in different directions. For example, the program may provide instructions for the motor 22 to turn in a first direction for a predetermined revolution, and then reverse to a second direction for second predetermined revolution. For example, in one pattern, the tool 14 may proceed forward for a complete revolution before reversing for a partial revolution to break chips of material that are oftentimes associated with tool drilling, and repeat the process until the hole is tapped to a desired depth.

In another example program, the rotor 22 of the motor 12 may be rotated forward and reversed for a determined number of revolutions. Such programming may be used for tightening a nut to a position on a shaft, or in driving a screw having a thread pitch to a desired depth. To improve the accuracy, such as, for example, to avoid the controller 10 counting revolutions before a screw or nut has engaged the work piece, the controller 10 may be adapted to not start counting revolutions until after an initial torque has been sensed, such as through feedback from the one or more motor sensors 28 and/or by associated computations by the controller 10.

Additionally, according to certain embodiments, the user may manually activate, deactivate, set, and/or alter the application of such programming or parameters, such as, for example, through the operation of a controller interface 32 that is in communication with the controller 10. A variety of different controller interfaces may be employed, including, for example, a touch screen, graphical interface, switches, buttons, levers, or dial controls, among others. Such a controller interface 32 may allow the user to set a variety of different parameters, such as the speed or torque being provided by the tool 14 and/or motor 12. The ability to use the controller 10 to control the torque provided by the motor 12 may permit at least certain tools to not require a mechanical clutch mechanism, which may thereby improve the reliability, accuracy and costs of the tool 14. For instance, if the power tool 14 is a drill driver, the tool 14 can be used as a torque wrench due to the accuracy of the torque sensing and/or controlling abilities of the controller 10.

According to certain embodiments, the controller 10 may also be adapted to display information pertaining to the settings, parameters, performance, or operation of the motor 12 and/or power tool 14 on a display 36, such as, for example, an LCD display, among others. For example, the display 36 may display torque and/or speed settings, or setting options for the motor 12, as well as information reflecting the speed and/or information detected by the motor sensors 28. According to certain embodiments, the display 36 may be part of the controller interface 32.

Feedback provided from at least the one or more motor sensors 28 to the controller 10, such as the speed and/or torque of the motor 12, among other information, may be stored or otherwise recorded by the memory 15. Additionally, the controller 10 may be adapted to monitor the feedback provided by the motor sensors 28 so as to adjust, if necessary, the operation of the motor 12. For example, if an operation parameter for the motor 12 has been set, such as, for example, torque, the controller 10 may make adjustments relating to the operation of the motor 12, such as adjustments relating to the supply of current to the motor 12, until the motor 12 attains or stays, within or at the set parameter for the desired torque. Thus, for example, when the tool 14 reaches the set maximum torque setting, then, depending on the application, the rotation of the tool 14 may be stopped and/or the rotation of the rotor 22 may be altered. According to certain embodiments, the ability to stop the rotation of the tool 14 (or associated components) when a maximum torque setting is attained may also remove the need for a mechanical clutch.

According to certain embodiments, such stored feedback from the motor sensors 28 may also be associated with the stored information pertaining to the corresponding operation of the user input 30, as well as alter the ease at which the user input 30 may be operated. For example, according to certain embodiments, the user input 30 may be a pressure sensitive trigger. In such embodiments, the controller 10 may include pressure sensitive switch technology that controls, and alters, the ease at which the user may squeeze the trigger based on whether the tool 14 and/or motor 12 are below, at, or above, one or more set operational parameters, such as, for example, a set torque or speed range. According to such embodiments, the controller 10 may be adapted to increase the pressure required to be exerted by the user on the trigger to increase the torque and/or speed of the tool 14 and/or motor 12.

According to certain embodiments, the user input 30 may include a touch sensitive control, such as a multi-zoned programmable pressure sensitive trigger that is operably connected to the controller 10. The multi-zoned trigger may be adapted for identification of the degree and location of pressure being exerted by the user on the multi-zoned trigger. Such identification may be used to control and/or provide input to various functions and/or modes of the tool 14. For example, in certain embodiments, the degree and location of pressure exerted on the multi-zoned trigger may be used to configure the electronic clutch, the depth of cut or drilled hole, the length of stroke (e.g., for a jig saw or reciprocating saw, among others), and/or may control the speed of the tool 14 and/or motor 12, among other controllable features.

Additionally, the controller 10 may be adapted to provide a learning mode in which the controller 10 records, stores or is programmed with information reflecting operating parameters that occurred during usage of the tool 14, including usage during various operating scenarios. Such information regarding the operation of the tool 14 and/or motor 12 may include feedback from the one or more motor sensors 28, information provided by the user via the controller interface 32, and/or from the user input 30. Such a learning mode may allow for later retrieval and reproduction of the operating parameters for a particular task without the user having to provide additional input. According to certain embodiments, the information may be stored as a program in the memory 15, with the program being subsequently available for retrieval and use when using the tool 14 through user operation of the controller interface 32. Alternatively, according to certain embodiments, the controller 10 may be adapted to automatically reproduce the operating parameters when a user operates of the user input 30, such as, for example, when the user activates the trigger. The controller 10 may then provide commands that have the tool 14 reproduce the operating parameters that were recorded when the controller 10 was in the learning mode.

Thus, when performing a task that needs to be repeated a certain number of times, the user may use the controller interface 12 to set the tool 14 to the learning mode, perform one complete task with tool 14 in manual mode, and finish the task. The controller 10 may then store the learned routine based on feedback from the one or more motor sensors 28, user input 30, current sensor 26, and/or controller interface 32, among other sources of information, and then subsequently re-execute the learned program for the required number of times. For example, a drilling tool can be utilized to drill through multiple materials that require different motor 12 speeds and torque. In such situations, the user can perform the steps of setting drill to the learning learn mode, perform one operation manually, vary the speed and torque of the motor 12 while drilling through the different materials, finish data collection, save the learned program, and then later re-call and execute the learned program while repeating a similar drilling task.

According to certain embodiments, the tool 14 may include or be operably connected to strobe light 36, such as, for example, a synchronized strobe light, including an LED or other suitable strobe. For example, according to certain embodiments, the strobe light 36 may be integral to the tool 14 and in communication with the controller 14, while according to other embodiments the strobe light 36 may be externally controlled and/or synchronized to the tool 14. Additionally, the strobe light 36 may be turned on momentarily during each revolution or completion of multiple revolutions, and turned off the remaining portion of the revolution. Such activation and deactivation of the strobe light 36 may allow for the appearance that a driven portion of the tool 14, such as a drill bit for example, is stationary, and thereby provide a relatively easy view for the user to confirm the accuracy of the work. In order to better control the strobe effect of the strobe light 36, the tool 14 may be capable of being programmed such that the strobe light 36 will turn on and off at different multiples depending upon the number of revolutions of the motor 12. Additionally, according to certain embodiments, the controller 10 may be adapted to calculate the position of the motor 12 and/or position of the associated driven component or accessory, such as the position of a drill bit, among others. This feature may allow the tool 14 to avoid certain strobe frequencies that are too fast for the user to see and/or also avoid certain health related frequencies know to be detrimental to certain people. Additionally, the strobe frequencies of the strobe light 36 may be pre-set (e.g. nonadjustable) and/or may be adjustable by the user as desired.

According to certain embodiments, the controller 10 may include and/or store, such as in the memory 15, a particular program for a specific operation, such as a drilling and tapping program, among others. Additionally, the program may be uploaded or downloaded to the controller 10, such as through the use of the secondary input 34, learned through operation of the tool 14 and/or feedback from the motor sensors 28 during operation of the tool 14, and/or otherwise provided to the tool. For example, the programmable content may be provided to the controller 10 through the use of any suitable connectivity medium including, for instance, Bluetooth, wireless, IR, USB, among others.

Figure 2:
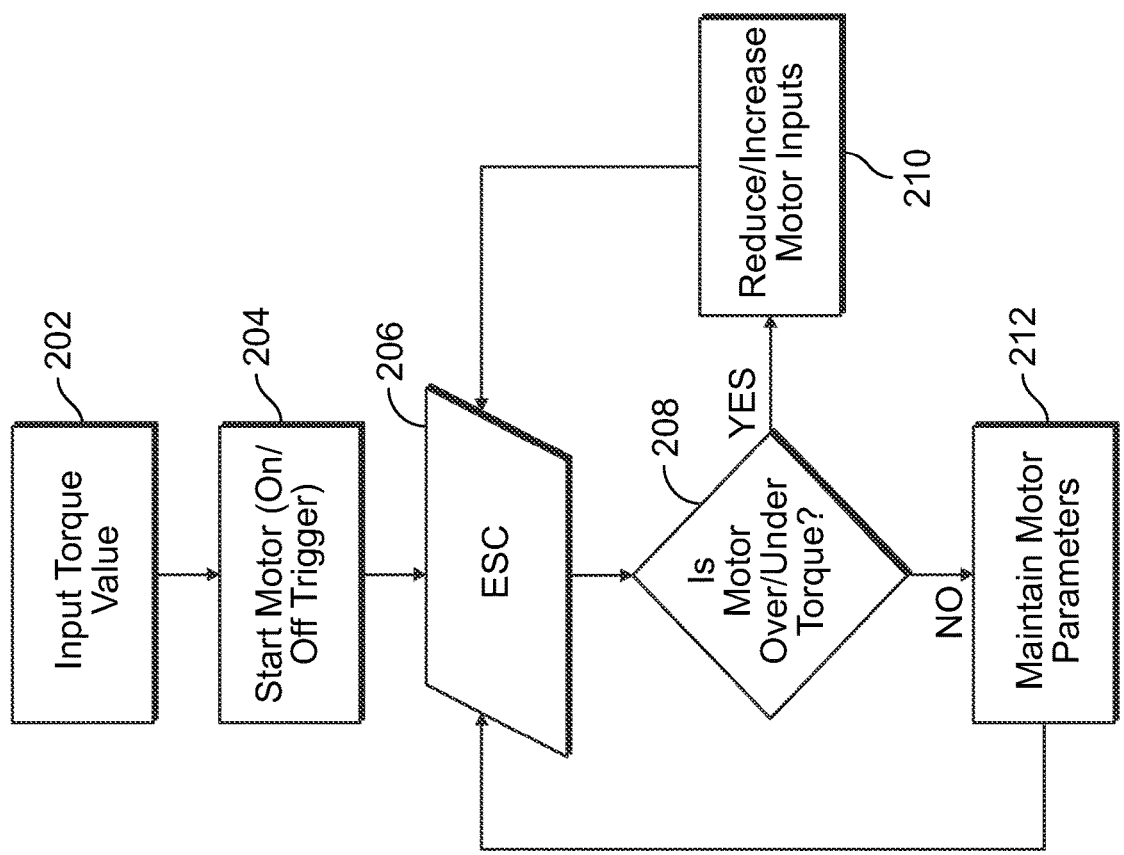
FIG. 2 illustrates a flow chart for setting a torque parameter for a brushless DC motor for a power tool according to certain embodiments of the present invention.

FIG. 2 illustrates a flow chart for setting a torque parameter for a brushless DC motor 12 for a power tool 14 according to certain embodiments of the present invention. At step 202, a torque value may be inputted into the controller 10, such as, for example, by operation of the controller interface 32, selection of a program stored by the memory 15, and/or downloading or uploading through use of the secondary input 34. According to certain embodiments, the torque value may be a specific torque, a torque range, or a maximum or minimum torque. Alternatively, different ranges of torques may be inputted, so that the tool 14 is capable of varying the torque at certain intervals, or in response to detection of particular operating characteristics. Additionally, the torque may be inputted by direct selection of the torque, or via indirect selection, such as the general selection of a program that has associated parameters that include a particular torque value. At step 204, the motor 12 may be started, such as, for example, by the user operating the user input 30. Additionally, as the torque that is to be attained by or through the operation of the motor 12 has been inputted at step 202, according to certain embodiments, the actual torque provided by the operation of the motor 12 may be independent of the degree to which the user engages the user input 30, such as whether the user is only partially or fully displacing the trigger.

At step 206, the controller 10, such as an ESC circuit, may provide signals to operate the motor 12 within desired parameters to satisfy the torque value inputted at step 202. At step 208, a determination is made, such as by the controller 10, as to whether the tool 14 and/or motor 12 is providing torque that satisfies the torque value inputted at step 202. According to certain embodiments, this determination may be made using information or feedback provided by the one or more motor sensors 28 and/or the current sensor 26, among others, to the controller 10. However, according to certain embodiments, the controller 10 may be adapted to allow for at least certain operational tolerances, such as, for example, tolerances in reaction time for at least the controller 10 and motor 12 to account for various factors including environmental issues, among other considerations.

If a determination is made that the torque value inputted at step 202 is not being satisfied, then at step 210, the controller 10 may provide appropriate instructions that adjust the operation of the motor 12 so as to either increase or reduce the torque being provided by the motor 12. If however at step 208 it is determined that the desired torque value is being satisfied by the current operation of the motor 12, then at step 212, the controller 10 may continue to maintain the operation of the motor 12 under the current operating instructions. According to certain embodiments, the process may then repeat steps 206-212, as necessary, until the user disengages the user input 30 and/or alters the inputted torque value (step 202).

Figure 3:
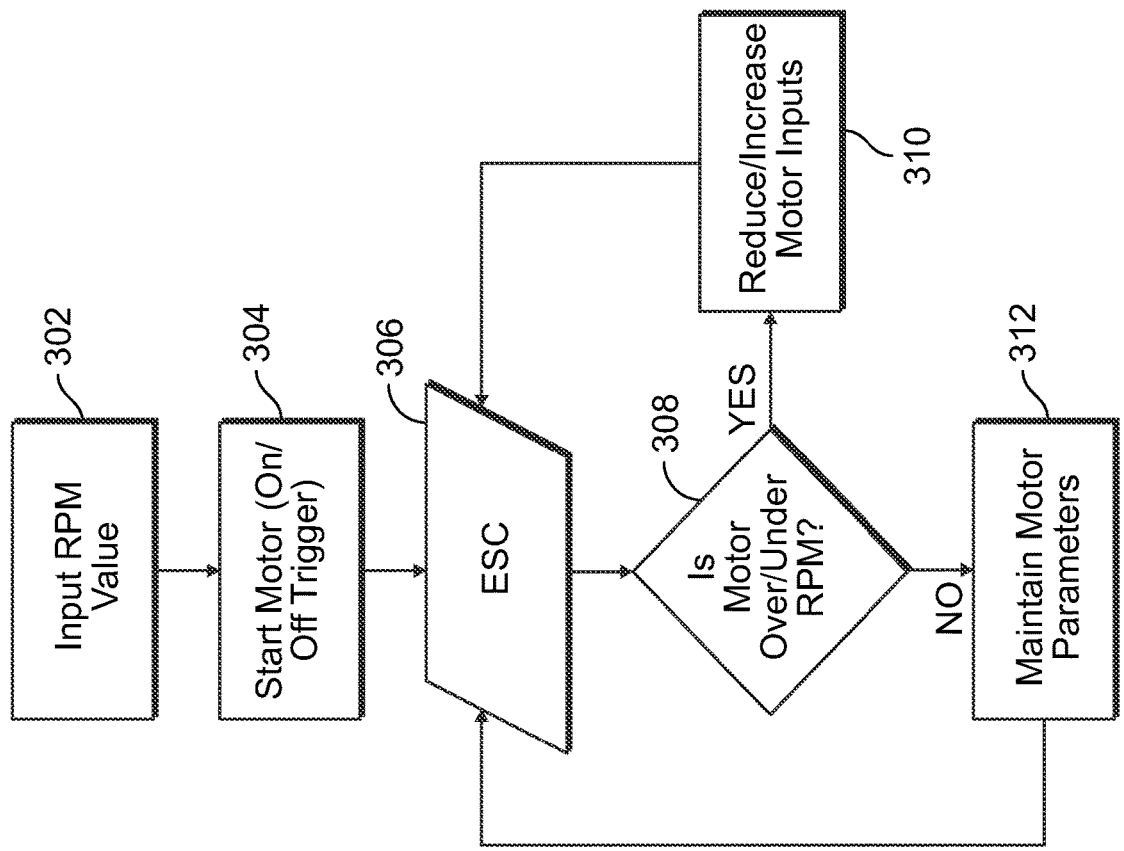
FIG. 3 illustrates a flow chart for setting a speed parameter for a brushless DC motor for a power tool according to certain embodiments of the present invention.

FIG. 3 illustrates a flow chart for setting a speed parameter for a brushless DC motor 12 for a power tool 14 according to certain embodiments of the present invention. At step 302, a speed value may be inputted into the controller 10, such as, for example, by operation of the controller interface 32, selection of a program stored in the memory 15, and/or downloading or uploading through use of the secondary input 34. According to certain embodiments, the speed value may be a specific speed, a speed range, or a maximum or minimum speed. Alternatively, different ranges of speeds may be inputted, so that the tool 14 is capable of varying the motor speed at certain intervals, or in response to detection of particular operating characteristics.

Additionally, the speed may be inputted by direct selection of a speed value, or via indirect selection, such as the general selection of a program that has associated parameters that include a particular motor speed. At step 304, the motor 12 may be started, such as, for example, by the user operating the user input 30. Additionally, as the speed that is to be attained by or through the operation of the motor 12 has been inputted at step 302, according to certain embodiments, the actual speed attained by the motor 12 may be independent of the degree to which the user engages the user input 30, such as whether the user is only partially or fully displacing the trigger.

At step 306, the controller 10, such as an ESC circuit, may provide signals to operate the motor 12 within desired parameters to satisfy the speed value inputted at step 302. At step 308, a determination is made, such as by the controller 10, as to whether the tool 14 and/or motor 12 is providing a speed that satisfies the speed value inputted at step 302. According to certain embodiments, this determination may be made using information or feedback provided by the one or more motor sensors 28 to the controller 10. For example, if the load being exerted on the tool 14 has slowed the rotation of the rotor 22, the controller 10 may adjust the operation of the motor 12 so that the motor still maintains the desired speed. However, according to certain embodiments, the controller 10 may be adapted to allow for at least certain operational tolerances, such as, for example, tolerances in reaction time for at least the controller 10 and motor 12 to account for various factors including environmental issues, among other considerations.

If a determination is made that the speed value inputted at step 302 is not being satisfied, then at step 310, the controller 10 may provide appropriate instructions that adjust the operation of the motor 12 so as to either increase or reduce the speed of the motor 12 and/or component being driven by the motor 12. If however at step 308 it is determined that the desired speed value is being satisfied by the current operation of the motor 12, then at step 312, the controller 10 may continue to maintain the operation of the motor 12 under the current operating instructions. According to certain embodiments, the process may then repeat steps 306-312, as necessary, until the user disengages the user input 30 and/or alters the inputted speed input value (step 302).

Figure 4:
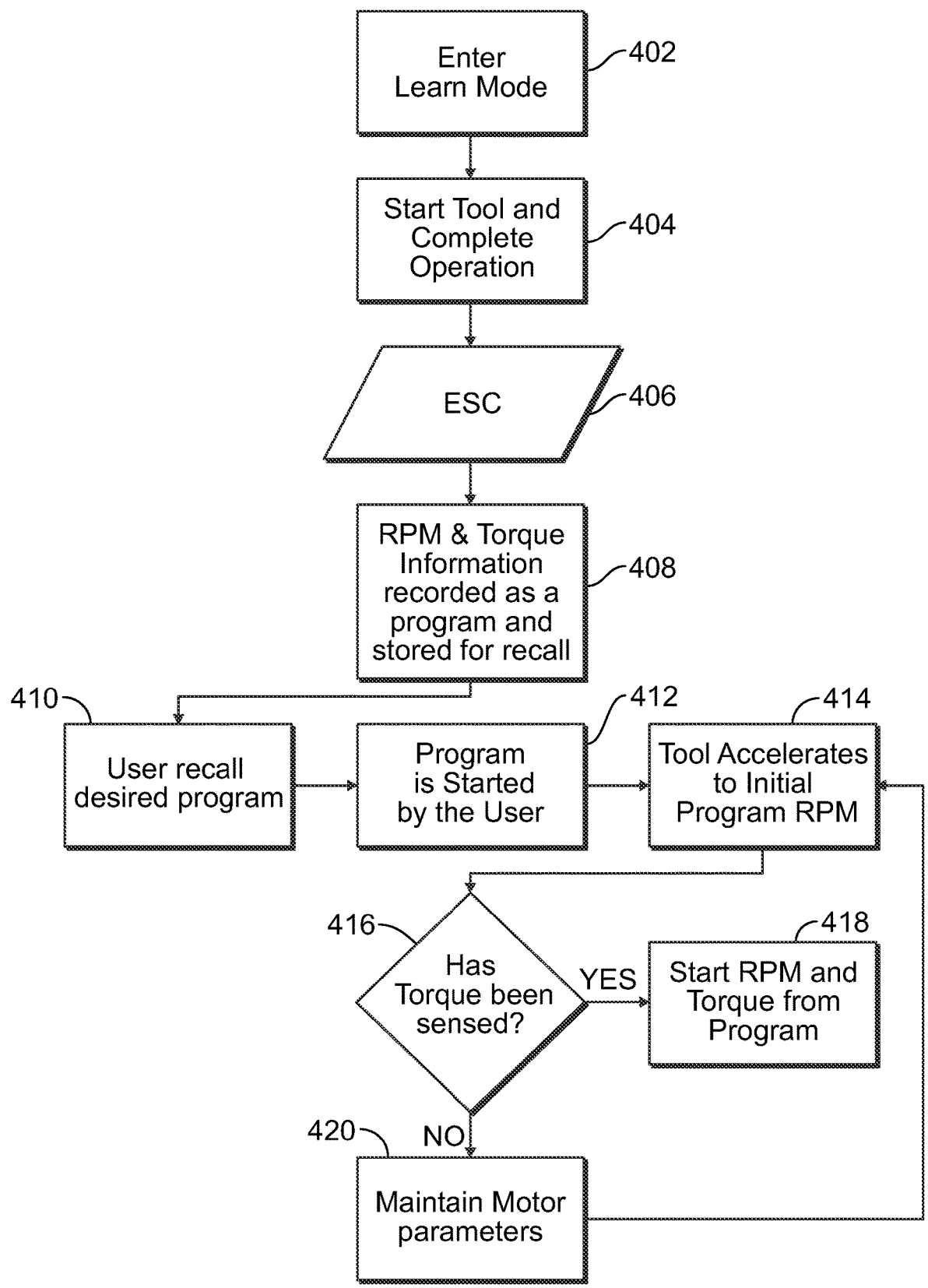
FIG. 4 illustrates a flow chart of a learning mode for a controller used with a brushless DC motor for a power tool according to certain embodiments of the present invention.

FIG. 4 illustrates a flow chart of a learning mode for a controller 10 used with a brushless DC motor 12 for a power tool 14 according to certain embodiments of the present invention. At step 402, the controller 10 may enter or start the learning mode via user operation of the controller interface 32. At step 404, the tool 14 may be started, such as by user operation of the user input 30. The user may continue operating the tool 14 until completion of a task and/or the determination that the sufficient data from the operation of the tool 14 has been attained by the controller 10. At step 406, feedback of operational information may be supplied to the controller 10, such as an ESC circuit, via the motor sensor 28 and/or the current sensor 26, among others. This feedback may begin at or around the time the user activated the user input 30 at step 404, and may be terminated at or around the time activation of the user input 30 is terminated.

At step 408, at least a portion of the operational information attained during the operation of the tool 14 may be recorded by the controller 10, such as by the memory 15, as a program that is stored for later recall and/or use in operating the tool 14. For example, operational parameters stored may include motor 12 torques and/or speed, among others. Additionally, the manner in which the parameters are stored may be selected, such as whether to store an average of a particular parameter, or variances of the parameters that occurred during different time periods of operation of the tool 14. Thus, the controller 10 may be adapted to collect data from previous runs/usages of tool 14, store that data, organize the data, and execute the data as a program/executable file.

At step 410, the user may elect to select and recall a program stored in by the controller 10, including, but not limited to, a program that was saved at step 408. At step 412, the program selected by the user may be started, such as, for example, by activation of the user input 30. In the present example, the retrieved program is directed to two operational parameters, namely motor 12 speed and torque parameters. In such an example, at step 414, the tool 12 may accelerate to an initial program speed, which, according to certain embodiments, may be a speed that is the same or different than the speed at which the motor 12 is to operate at when the tool 14 actually begins the task associated with the selected program. At step 416, the controller 10 may determine whether a torque, such as, for example, a predetermined minimum torque level, has been sensed. Such a sensed torque may indicate whether the tool 14 has begun being used for the task associated with the selected program, such as, for example, whether the tool 14 is engaging a particular item or material. As previously discussed, the sensing of the torque may involve feedback provided to the controller 10 by the one or more motor sensors 28. If the torque referenced at step 416 has been sensed, then at step 418 the controller 10 may have the motor 12 speed and torque attain desired levels, as indicated by the selected program, if necessary. However, if torque at step 416 has not been sensed, then at step 420 the controller 10 may continue to maintain the initial operational parameters from step 414.

Figures 5, 7:
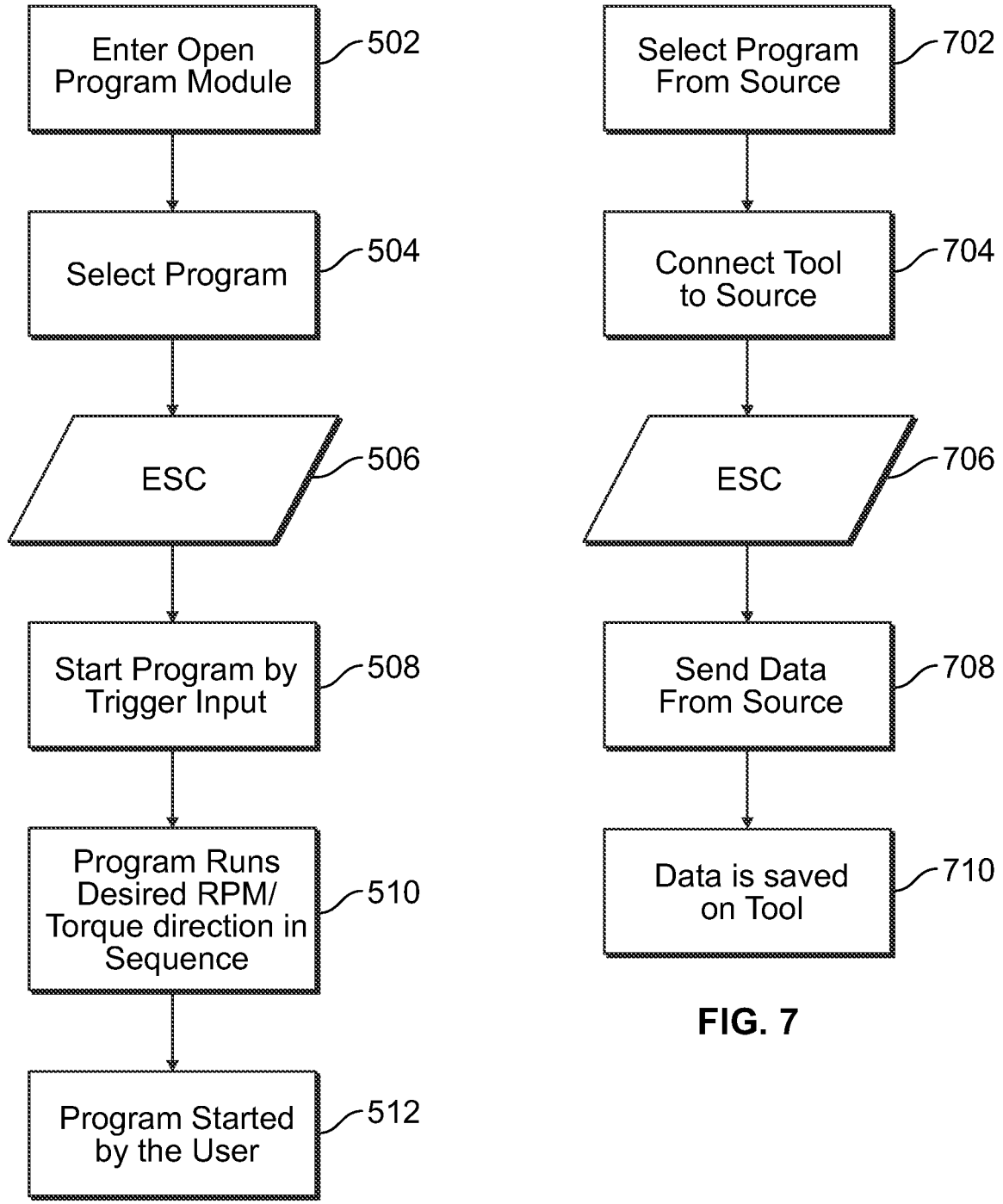
FIG. 5 illustrates a flow chart for operating a brushless DC motor for a power tool using a program stored in a controller according to certain embodiments of the present invention.
FIG. 7 illustrates a flow chart for downloading information to a controller used with a brushless DC motor for a power tool according to certain embodiments of the present invention.

FIG. 5 illustrates a flow chart for operating a brushless DC motor 12 for a power tool 14 using a program stored in a controller 10 according to certain embodiments of the present invention. At step 502, the user may engage the controller interface 32 to attain a listing or viewing of one or more available programs or categories of programs. At step 504, the user may select a particular program to be used during the upcoming operation of the tool 14. At step 506, the controller 10, such as an ESC circuit, may provide signals to operate the motor 12 within desired parameters to satisfy the parameters associated with the program selected at step 504. At step 508, the program may be started by user activation of the user input 30. At step 510, the program may be carried out during the operation of the tool 14, such as, for example, the controller 10 providing instructions that control and/or vary the speed, torque, and rotational direction of the motor 12 during the operation of the tool 14. At step 512, the program may be terminated, such as, for example, by the user disengaging the user input 30.

Figure 6:
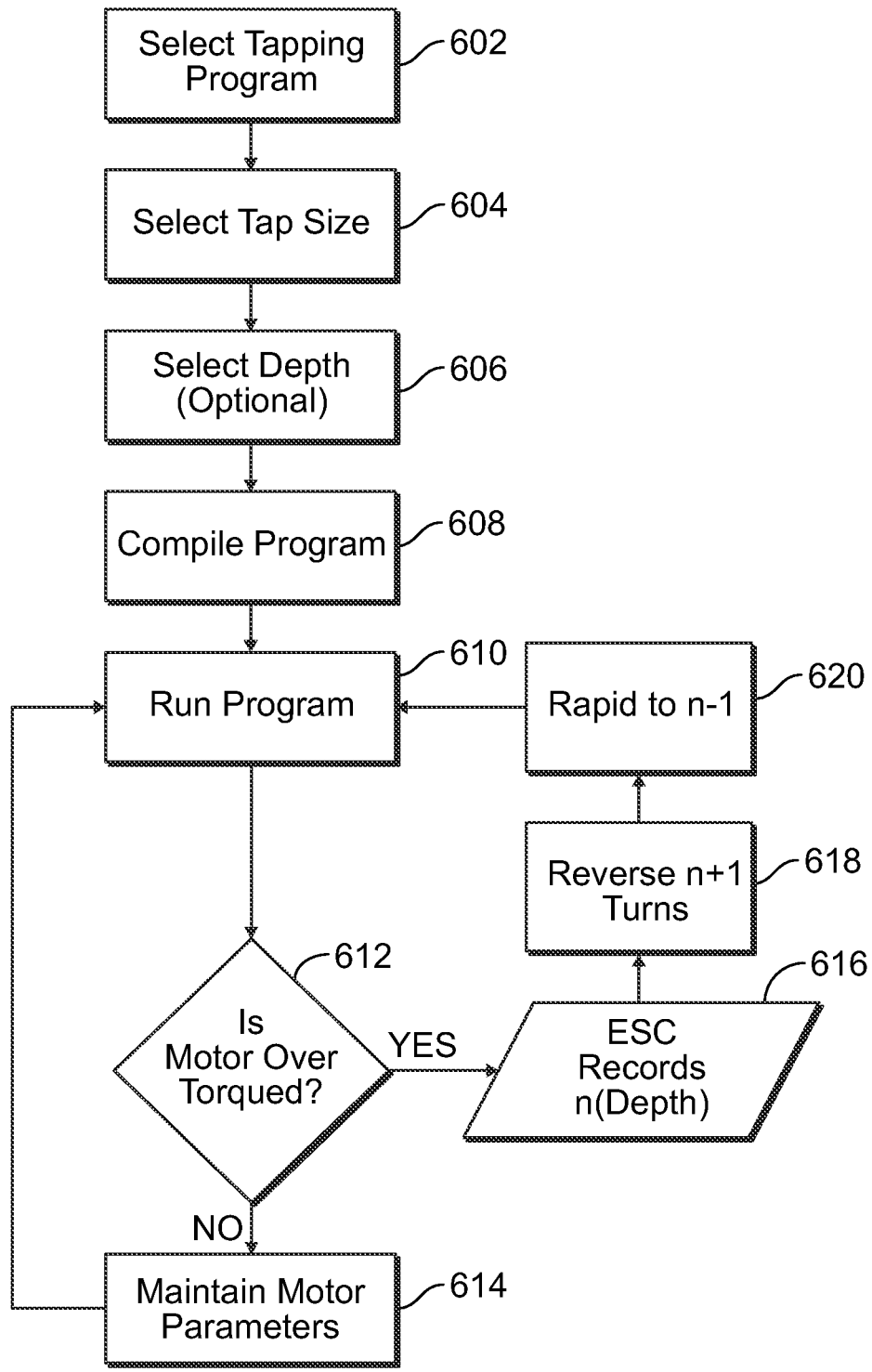
FIG. 6 illustrates a flow chart for operating a brushless DC motor for a power tool in which a tapping program is created by the user and executed by a controller according to certain embodiments of the present invention.

FIG. 6 illustrates a flow chart for operating a brushless DC motor 12 for a power tool 14 in which a tapping program is created by the user and executed by a controller 10 according to certain embodiments of the present invention. At step 602, the user may begin creating a drilling and tap program by providing an indication that a taping program is being created. According to certain embodiments, such an indication may result in a template being provided requesting information relating to drilling and tapping procedures. Additionally, such a template may already have pre-determined or set operating procedures, such as, for example the number clockwise rotations of the rotor 22 before the rotor 22 is to be rotated in a counter-clockwise direction, as well as the number of counter-clockwise rotations before the rotor 22 is again to be rotated a clockwise direction. Alternatively, the user may need to proceed with creating a new program without the benefit of a pre-set template.

At step 604, the user may select or otherwise identify a tap size, which may provide an indication of the diameter and thread spacing. At step 606, the user may have the option of indicating the depth of the hole is to be tapped. At 608, the program may be compiled using information provided in steps 602-606, as well as existing known parameters, if desired, and saved by the controller 10.

For example, the controller 10 may be adapted to calculate the position of the motor at any point during each revolution. Thus, the controller 10 can start and stop the motor 12 at key points in either direction (e.g., clockwise or counter-clockwise). Moreover, the controller 10 may be able to tell, and provide associated instructions for, where the motor 12 is to stop and start, and how far the rotor 22 or associated driven component is to rotate. This allows the user to select a program where the motor 12 could be rotated forward and reversed at set intervals and amounts of travel/revolution. Such forward and reverse intervals in multiple combinations may be a part of a program, such as, for example, in using the tool 14 to tap a hole, such as having the motor 12 turn a drill bit forward 1 revolution before reversing the direction of the bit for ⅓ of a revolution to break chips off of the drilled material. This process could then be repeated until a desired depth of the tap is attained in the hole (e.g., 15.5 revolutions in total to the bottom of a hole).

At step 610, the tool 14 may be operated by executing the program. During operation, the controller 10 may monitor whether the motor 12 is being over-torqued, such as at step 612, by using feedback provided to the controller 10, such as from the motor sensors 28, among others. If the motor 12 is not being over-torqued, then at step 614, the controller 10 may continue to maintain the operating parameters that were being used to operate the motor 12. If, however, the motor 12 is being over-torqued, then at step 616 the controller 10 may determine the current depth of the bit before, at step 618, reversing the direction of the motor 12 to back the bit out of the hole at least one turn. Such backing of the bit out of the hole may allow for the removal of debris created by the drilling and tapping operation that may have remained in the hole and is at least assisting in creating an undesirable load on the motor 12. At step 620, the controller 10 may again reverse the direction of the bit so that the bit returns to being rotated and displaced in a direction that cuts and/or drills into the material.

FIG. 7 illustrates a flow chart for downloading information to a controller 10 used with a brushless DC motor 12 for a power tool 14 according to certain embodiments of the present invention. At step 702, a program may be selected from a source that is external to the tool 14, such as, for example a computer, server, or mobile phone, among others. At step 704, the tool 14 may be operably connected to the remote source of the program, such as, for example, through the use of the secondary input 34, as previously discussed. At step 706, the controller 10, such as an ESC circuit, may be prepared to receive the program or data from the program that is being maintained by the external source. At step 708, data, or the program, from the external source, may be sent from the external source to the controller 10. At step 710, the data or program that was been downloaded to the controller 10 at step 708 may be saved on the tool 14, such as, for example, being saved by the memory 15.

While the apparatus has been described with reference to preferred embodiments, it will be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. A power tool comprising:
a brushless DC motor comprising a rotor;
a controller;
one or more motor sensors coupled to the controller, the one or more motor sensors configured to:
   detect information related to the operation of the brushless DC motor, and
   provide feedback corresponding to the detected information to the controller;
the controller having a processor and a memory, the controller configured to:
   monitor, by the processor, both a number of clockwise and a number of counter-clockwise rotations of the rotor of the brushless DC motor based at least in part on the feedback from the one or more motor sensors; and
   control, by the processor, operation of the brushless DC motor to:
      reverse the direction of the rotor after the rotor has completed a predetermined number of the number of clockwise rotations; and
      reverse the direction of the rotor after the rotor has completed a predetermined number of the number of counter-clockwise rotations.

2. The power tool of claim 1, wherein the controller is configured to:
receive feedback from one or more motor sensors that reflect whether the motor is operating at or within one or more parameters; and
adjust the operation of the brushless DC motor based on the received feedback so that the brushless DC motor operates at or within the one or more parameters.

3. The power tool of claim 2, wherein the power tool further includes a user input, a controller interface, and a display.

4. The power tool of claim 3, wherein the controller is configured to:
record on the memory the received feedback provided from the one or more motor sensors;

store the recorded feedback on the memory as a program; and execute the program to replicate the operating conditions of the brushless DC motor associated with the feedback provided by the one or more motor sensors.

5. The power tool of claim 4, wherein the controller is configured to begin to record the feedback on the memory when the user engages the user input.

6. The power tool of claim 4, wherein the controller interface is configured to allow the user to select a program for operation of the tool from a plurality of programs stored on the memory.

7. The power tool of claim 3, wherein the one or more parameters includes at least one of the following: a motor torque and a motor speed.

8. The power tool of claim 7, wherein the power tool includes a secondary input configured to receive data for the controller from an external source.

9. The power tool of claim 1, wherein the controller is configured to determine a rotational position of a rotor of the brushless DC motor.

10. The power tool of claim 9, wherein the power tool comprises a strobe light, the strobe light operably connected to the controller, the controller being configured to activate and deactivate the strobe light based on the determined rotational position of the rotor.

11. A power tool comprising:
a brushless DC motor;
a controller;
one or more motor sensors coupled to the controller, the one or more motor sensors configured to:
detect information related to the operation of the brushless DC motor, and
provide feedback corresponding to the detected information to the controller;
the controller having a processor and a memory, the controller configured to:
provide instructions, by the processor, to control the operation of one or more parameters of the brushless DC motor;
receive, by the processor, motor torque and motor speed feedback parameters from the one or more motor sensors in response to manual operation of the brushless DC motor;
store, by the processor, on the memory the received motor torque and motor speed feedback parameters as at least part of a program;
recall, by the processor, the program from the memory;
accelerate the power tool to an initial motor speed until a power tool torque is sensed by the one or more motor sensors; and
execute, by the processor, the program having the received motor torque and motor speed feedback parameters to replicate the operating conditions of the brushless DC motor associated with the received motor torque and motor speed feedback parameters after the power tool torque is sensed.

12. The power tool of claim 11, wherein the power tool further includes a user input, a controller interface, and a display.

13. The power tool of claim 12, wherein the controller interface is configured to allow the user to select a program for operation of the power tool from a plurality of programs stored on the memory.

14. The power tool of claim 11, wherein the power tool further includes a strobe light viewable by the user, the strobe light operably connected to the controller, the controller being configured to activate and deactivate the strobe light based on a rotational position of a rotor of the brushless DC motor.

15. The power tool of claim 11, wherein the power tool includes a secondary input configured to receive data for the controller from an external source.

16. A power tool comprising:
a brushless DC motor;
a controller;
one or more motor sensors coupled to the controller, the one or more motor sensors configured to:
detect information related to the operation of the brushless DC motor, and
provide feedback corresponding to the detected information to the controller;
a user input coupled to the controller, the user input displaceable in response to a pressure applied by a user to operate the brushless DC motor; and
the controller having a processor and a memory, the controller configured to:
receive instructions, by the processor, to set one or more desired parameters for the operation of the brushless DC motor;
monitor, by the processor, the operation of the brushless DC motor based on feedback from the one or more motor sensors;
determine, by the processor and based on the monitored operation of the brushless DC motor, whether the brushless DC motor is maintaining the one or more desired parameters; and
adjust, by the processor, the pressure required by the user to displace the user input based on the determination of whether the brushless DC motor is maintaining the one or more desired parameters.

17. The power tool of claim 16, wherein the power tool further includes a controller interface, and a display, and wherein the user input is a multi-zoned programmable pressure sensitive trigger.

18. The power tool of claim 17, wherein the one or more parameters includes at least one of the following: a motor torque and a motor speed.

* * * * *

UNITED STATES PATENT AND TRADEMARK OFFICE
CERTIFICATE OF CORRECTION

| | | |
|---|---|---|
| PATENT NO. | : 10,903,765 B2 | Page 1 of 1 |
| APPLICATION NO. | : 13/735865 | |
| DATED | : January 26, 2021 | |
| INVENTOR(S) | : Knight et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2010 days.

Signed and Sealed this
Seventh Day of February, 2023

Katherine Kelly Vidal
*Director of the United States Patent and Trademark Office*